S. DIXSON.
Sulky-Plow.
No. 207,720.  Patented Sept. 3, 1878.
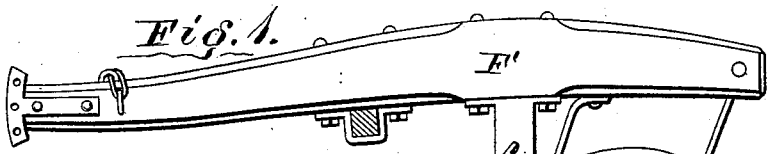
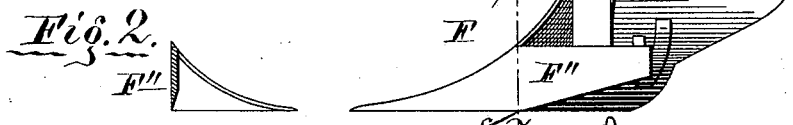
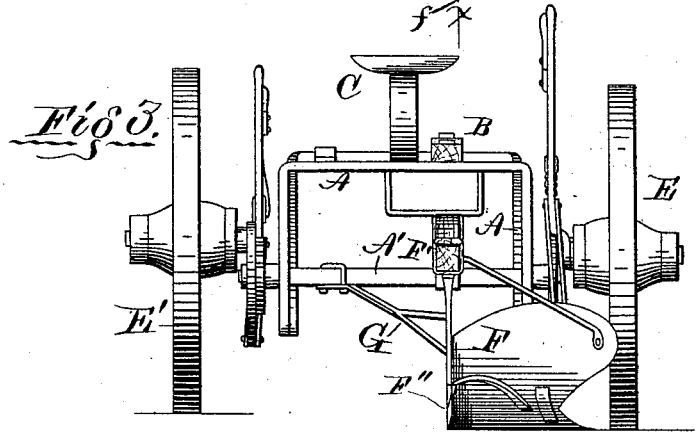
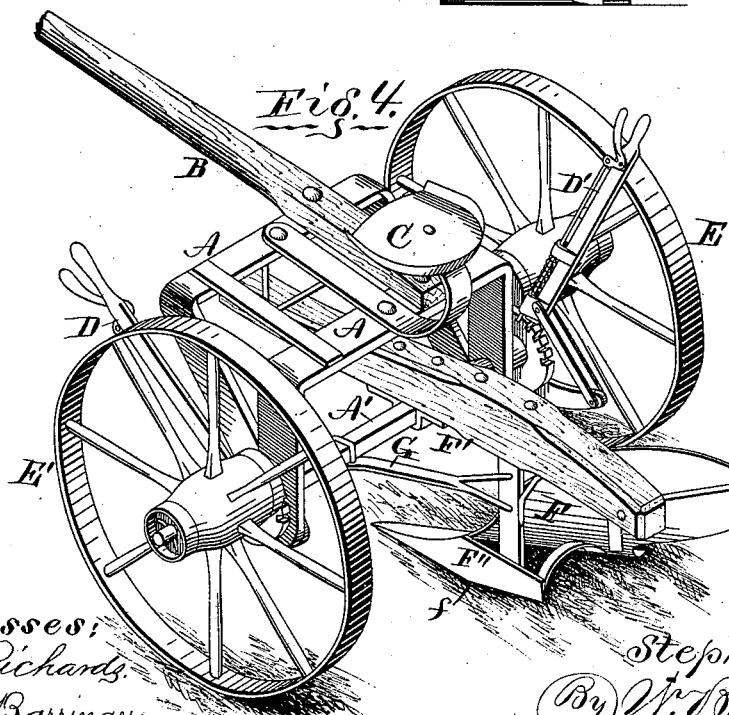
Witnesses:
P. R. Richards
M. H. Barringer
Inventor
Stephen Dixson
By W. B. Richards, Atty.

UNITED STATES PATENT OFFICE.

STEPHEN DIXSON, OF ROSEVILLE, ILLINOIS.

IMPROVEMENT IN SULKY-PLOWS.

Specification forming part of Letters Patent No. 207,720, dated September 3, 1878; application filed August 12, 1878.

*To all whom it may concern:*

Be it known that I, STEPHEN DIXSON, of Roseville, in the county of Warren and State of Illinois, have invented certain new and useful Improvements in Sulky-Plows; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1 is a side elevation of a plow of the construction embodied in my invention. Fig. 2 is a sectional view in the line $x\ x$ in Fig. 1. Fig. 3 is a rear elevation of the plow shown at Fig. 1 and a wheel attachment. Fig. 4 is a perspective view.

This invention relates to improvements in wheel-plows; and consists in making the plow land-side bar with a sharpened lower edge, to facilitate the plow re-entering the soil as it is raised and lowered by the wheel on the same side of the machine, passing over slight elevations of various kinds.

The invention further consists in the combination of a brace with the plow, having the rear bottom portion of its land-side bar removed and its lower edge sharpened, and the wheel-frame to aid in holding the plow against the side pressure of the furrow-slice.

Referring to the parts by letters, letters A A' represent the frame, B the draft-pole, C the driver's seat, D D' the levers for raising and lowering the sides of the frame A A', E the furrow-side wheel, and E' the land-side wheel, of an ordinary sulky or wheel attachment to turning-plows, the operation of which is well understood, and need not be described further here.

F is the plow, the beam F' of which is attached to the transverse bar A' of the sulky-frame, as shown in the drawings, or may be attached in any ordinary manner.

As shown, the bar A is journaled at its ends to permit oscillating the plow in a vertical plane; but the plow-beam may be journaled to the bar A' to permit the same movement.

The plow F may have a mold-board of any ordinary construction, or formed of any usual material, and may be attached in any ordinary manner to the plow-beam.

F'' is the land-side bar. It may be attached to the plow in any desired or ordinary manner, and my improvement is in making it with its lower edge sharpened, as shown at Figs. 2 and 3 of the drawings. Thus sharpened, the land-side bar will cut into and re-enter the soil when it is lowered, after being raised by the land-side wheel E' passing over corn-stalks, sods, or other slight elevations, which elevations occur frequently, and have a tendency, with the ordinary mold-board, to produce much irregular depth of plowing.

The land-side bar F'' is cut away at its lower rear portion, commencing at a point, $f$, near the center of its length and at its lower side, and sloping upward and backward, and this rear portion is sharpened also at its lower edge. The lower portion thus cut away will facilitate its entrance into the soil after being raised and lowered by the wheel E', as herein described; and, further, in turning with the plow in the ground, and especially toward the right hand, the heel of the land-side bar, when thus cut away, will offer less resistance than when entire.

To prevent any lateral deflection of the plow in loose soil from the removal of the rear lower portion of the land-side bar, I place a brace, G, from the plow-standard to the bar A'.

Having thus described my invention, what I claim as new, and desire to secure by Letters Patent, is—

1. In a wheel-plow, the land-side bar of the plow, constructed substantially as described, and with a lower sharpened edge to facilitate its entrance into the soil when raised and lowered by slight elevations under the land-side wheel, as and for the purpose specified.

2. The land-side bar F'' of a plow constructed with a lower sharpened edge, substantially as described, and for the purpose specified.

3. In a wheel-plow, the brace G, attached at one end to the plow and at the other end to the wheel-frame, in combination with the plow, having the rear lower portion of its land-side inclined upward and its lower edge sharpened, substantially as described, and for the purpose set forth.

In testimony that I claim the foregoing as my own I affix my signature in presence of two witnesses.

STEPHEN DIXSON.

Witnesses:
H. A. ALLEN,
HARRY M. RICHARDS.